United States Patent Office 3,038,826
Patented June 12, 1962

3,038,826
LAMINATE AND PROCESS
Robert C. Medl, Evanston, Ill., assignor to The Richardson Company, Melrose Park, Ill., a corporation of Ohio
No Drawing. Filed July 3, 1959, Ser. No. 824,772
17 Claims. (Cl. 154—43)

This invention relates to synthetic laminates and, more particularly, to synthetic laminates formed from resin impregnated fillers wherein the resin and filler are consolidated as an integral product by heat and pressure.

Synthetic laminates have gained wide acceptance in the electrical and electronics industry as a non-conductive supporting base for components of a circuit, for example, tubes, condensers and relays or as insulation media separating elements of such components. These laminates are board-like in character and generally vary in thickness from about one-sixteenth of an inch up to about one-fourth of an inch, depending upon the end use. Laminates are normally made in standard sheet sizes and subsequently fabricated by dies, saws, drills, etc. for particular applications contemplated.

The usual laminate is made by impregnating a selected filler sheet with a thermosetting resin, superimposing a plurality of the impregnated sheets to form an assembly and subjecting the assembly to heat and pressure to form a consolidated integral unit.

A variety of thermosetting resinous compositions and filler sheets have been used in forming synthetic laminates. Typical resins are the phenolic condensation products of an aldehyde, such as the condensation products of phenol, cresols, or xylenols with formaldehyde. Also, for selected applications, melamine formaldehyde and polyester resins have, likewise, been used. Fillers are generally paper, canvas, linen and, to a limited extent, glass or asbestos cloth.

As indicated, it is usually desirable to fabricate the board-like laminates for particular applications contemplated. Generally, it has been necessary to heat laminates to temperatures extending up to about 175° and sometimes higher prior to fabrication in order to avoid appreciable cracking or chipping of the laminates around the areas which are subjected to the dies or tools used in fabrication. It is apparent that the need for a preliminary heat treatment prior to fabrication of laminates results in added expense and time and that the elimination of such a treatment would be a material advantage.

In addition to improved fabricating properties, present applications of synthetic laminates require improved electrical and physical properties, such as retention of properties over a relatively wide range of temperatures and resistance to blistering or degradation when subjected to high temperatures for short periods as might be encountered in soldering operations.

Accordingly, it is one of the principal objects of this invention to provide a synthetic laminate capable of being fabricated at or near room temperature, namely within a range of between about 40 to 100° F., without appreciable creation of cracks or chips.

Another object is to provide a laminate which may be fabricated at or near room temperature and which has excellent solvent resistance and cold flow properties.

A further object is to provide a laminate having generally improved properties as compared to many currently available laminates and an ability to retain its properties over a reasonable range of temperatures.

Another object is to provide laminates of the foregoing type which may be readily manufactured and which will have electrical and physical properties at least equal to and, in some instances, better than equivalent grade laminates currently available.

A still further object is the provision of a resinous system from which laminates of the foregoing type may be made.

Various suggestions have been made for reducing the fabricating temperature of laminates in order to permit them to be fabricated more rapidly and economically. Among such suggestions has been the use of plasticizers as an additive to the resinous compositions with which the laminate filler is impregnated. However, the addition of plasticizers to the resinous compositions from which laminates are formed has been generally unsatisfactory for several reasons. For example, many of the plasticizers proposed are inclined to be fugitive at moderately elevated temperatures. If a laminate containing such a plasticizer were subjected to a temperature much above, for example, 100° F., it would be found that the plasticizer tends to become volatilized, thereby leaving voids in the laminate into which moisture may enter and thus reduce electrical properties. Another disadvantage of many plasticizers heretofore proposed is that of an increase in cold flow properties of the laminate, whereby the laminate, even under moderate pressure or stress at ordinary temperatures, tends to deform. A further disadvantage frequently found when using many of the prior art plasticizers is that the laminates containing the same do not have adequate resistance to cleaning solvents, such as trichloroethylene. Solvents of this type are inclined to dissolve some of the plasticizers employed as additives to the resinous compositions used to impregnate fillers and, particularly, if the plasticizer is not chemically bound with the resin.

Laminates made in accordance with this invention are prepared by impregnating an appropriate filler with a resinous composition comprising: (1) the addition reaction product of an unsaturated oil and an unsaturated polycarboxylic acid, and (2) an epoxylated compound reactive therewith. The filler sheet is impregnated with the foregoing resinous composition, a plurality of impregnated sheets superimposed to form an assembly and the assembly consolidated by heat and pressure to form an integral unit, wherein the resinous composition is cured to a hard, substantially infusible state. When appropriate and to provide additional properties as may be desired in the laminate for selected applications, other resins may be added to the foregoing composition as more fully explained hereinafter.

As indicated, one of the principal components of the resinous composition is the addition reaction product of an unsaturated oil with an unsaturated polycarboxylic acid. The normal drying oils are generally considered to be unsaturated and, hence, capable of forming films by addition reactions or by oxidation. Drying oils are particularly suitable for forming the addition reaction product hereinabove mentioned. While many drying oils occur naturally, they may also be made synthetically or by dehydrogenation of a more saturated oil. A variety of drying oils may be used; however, a preferred class of drying oils are those which have a conjugated unsaturation. Illustrative examples of such drying oils are tung oil, oiticica oil, linseed oil, perilla oil, soya bean oil, safflower seed oil, dehydrated castor oil and the like. Drying oils of the foregoing type may form an adduct by means of the Diels-Alder reaction with an unsaturated acid, which reaction is considered herein as an addition reaction; or they may form an addition product with such acids wherein the oil is bonded to a single carbon atom of the unsaturated acid, for example, an alpha carbon atom, rather than forming the classical Diels-Alder structure.

Certain unsaturated oils, having less unsaturation than the aforementioned drying oils may, likewise, be combined with the unsaturated polycarboxylic acids for use in the present resin system. However, it is generally necessary to heat the latter compositions more drastically to obtain an addition reaction product of the desired type. The reaction, while an addition reaction, is not considered as a Diels-Alder type reaction. Exemplary unsaturated oils of the latter type are cotton seed oil and lard oil.

In general, the unsaturated oils contemplated are considered to be the glycerides of the corresponding unsaturated fatty acids. For purposes of this invention, the terms "unsaturated oil" and "drying oil" include not only the glycerides but also the corresponding fatty acids from which the oils are derived as well as esters of the unsaturated fatty acid and a monohydric alcohol, such as butanol, ethanol and methanol or higher polyhydric alcohols, such as pentaerythritol and sorbitol.

The preferred unsaturated polycarboxylic acids are those characterized by alpha-beta unsaturation, namely, maleic acid, fumaric acid, itaconic acid, mesaconic acid, citraconic acid, aconitic acid and glutaconic acid. Acids, such as citric acid, which will form an unsaturated polycarboxylic acid under the conditions of the addition reaction, may also be used in forming the addition reaction product. It will be understood that the term "acid" also includes the acid anhydride, as either the acid or anhydride are equally suitable in forming the aforementioned addition products with unsaturated oils.

To form the addition reaction product of, for example, a drying oil and an unsaturated polycarboxylic acid, it is usually necessary to heat a mixture of the two to elevated temperatures ranging from about 75° C. to about 200° C., depending upon the particular oil and acid combination. For oils with relatively little conjugated unsaturation or oils with no conjugation, temperatures as high as about 280° C. may be required. The reaction is exothermic and is evidenced by a moderate rise in temperature above that at which the mixture has been heated. Normally, one mole of unsaturated polycarboxylic acid is used for each mole equivalent of fatty acid present in the drying oil, where substantially complete reaction of the oil is desired. The usual drying oil is a triglyceride having three fatty acid mole equivalents per mole of triglyceride. This permits the use of three mole equivalents of unsaturated polybasic acid to be added to a single mole of the triglyceride oil. However, it has been found generally preferable, when using triglyceride drying oils, to react only one mole of the unsaturated polybasic acid for each mole of drying oil, thereby leaving the remaining fatty acid units of the triglyceride unreacted. Compositions of this type will provide for increased flexural qualities in a laminate.

The second major component of the resinous compositions is an epoxy compound, preferably having an average of more than one epoxy group per molecule. Such compounds are characterized by the presence of the epoxy or oxirane group

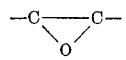

A typical epoxy compound which may be used is the diglycidyl ether of a bisphenol, such as is formed from the reaction of bisphenol-A and epichlorohydrin. Another suitable epoxy compound may be the polyglycidyl ether of a novolak-type resin, these latter compositions being the permanently fusible condensation products of a phenol and an aldehyde using an acid catalyst. Similar epoxy compounds which may also be used are epoxidized olefin, such as dicyclo dipentadiene diepoxide, as well as terpene diepoxide or an epoxidized drying oil, such as soya oil, linseed oil and the like. Likewise, di(ethyl hexyl) epoxy tetrahydrophthalate, or the corresponding methyl or butyl ester; or dicyclo pentadiene epoxide may be used, the esters mentioned imparting particularly high flexibility. While liquid or solid epoxide compositions may be employed, it has been found preferable to use those solid epoxidized compounds derived from bisphenol-A and epichlorohydrin which contain both epoxy groups and one or more hydroxyl groups.

In making the resinous composition, the addition reaction product of an unsaturated oil and the unsaturated polycarboxylic acid is mixed directly with the epoxy compound, preferably in a ratio wherein the acid equivalents are equal to or slightly less than the epoxy equivalents, it being assumed that one epoxy group is equivalent to a dicarboxylic acid or anhydride. In certain instances, the epoxidized compound, as indicated above, may contain some hydroxyl groups, in which event the hydroxyl groups can be considered as well as the epoxy groups for the purpose of forming the aforementioned ratio, it again being assumed that an hydroxyl group is equivalent to one carboxylic group. Epoxy compounds containing a limited number of hydroxyl groups have been found to be more readily reactive and, accordingly, the presence of some hydroxyl groups is desirable. If the particular epoxy compound employed does not contain hydroxyl groups, it may be found desirable to add a small amount of a compound containing hydroxyl groups, such as ethylene glycol, glycerol and butane-1,4-diol. Compounds of the latter type, when necessary, may be added in the amount of one to five percent based on the weight of the epoxy compound.

To initiate the desired reaction and resultant cure of the sysetem, it may be also desirable to add certain amines, generally from about 0.5% to about 2%, based on the weight of the epoxy compound. Typical amines are benzyldimethylamine, trimethylamine and piperidine.

For special applications and to achieve particular properties in the laminate, other modifying compounds made should be incorporated with the basic resinous composition. Illustrative modifying compounds are phenolic aldehyde condensation products, such as, for example, the condensation product of formaldehyde with phenol, cresols, resorcinols and xylenols or mixtures thereof. Other modifying compounds may be the condensation products of an aldehyde, such as formaldehyde with melamine, benzoguanamine and urea and particularly the butylated derivatives of these condensation products which tend to increase their compatibility. Modifying compounds of the above type are frequently desirable in order to increase stiffness, such compounds usually being added so as to comprise between about five to sixty percent based on the total weight of the resin solids. In general, resinous modifiers containing hydroxyl or amine groups, such as those condensed by formaldehyde, hexamethyltetramine, paraformaldehyde, urea and melamine, catalyze or promote the resin forming reaction between the aforementioned epoxy compound and the addition product.

Prior to impregnating filler sheets to form a laminate, the resinous composition is normally dissolved in a volatile solvent, such as propanol, butanol, ethyl acetate, methyl ethyl ketone, methyl butyl ketone or mixtures thereof to form a varnish. Further, one or more of the foregoing solvents may also be used in combination with an aromatic hydrocarbon, such as benzene, toluene or xylene, depending upon the particular components forming the resinous composition.

In the usual impregnating operation, filler from a roll is continuously introduced into a tank containing resin varnish, passed between rolls where excess varnish is drained and forced out, followed by introduction into a drying oven at elevated temperatures of between about 75–170° C., wherein volatiles are removed and the cure of the resinous composition partially advanced. The drying operation should not advance the cure of the resin to a point where it has lost its ability to flow under heat and pressure in the final laminating step.

The filler web may be, for example, a cellulosic kraft, sulphite, rag or linter paper; or it may be a mixture of cellulosic fibers with glass, nylon, polyester or acrylic fiber; or it may be a textile woven of glass, linen, cotton, or other fibers. Asbestos mat and cloth are also suitable webs.

In order to improve the moisture resistant properties of a laminate where the fillers used are formed from fibers having a high degree of porosity, such as cellulosic fibers, it is preferable to initially impregnate the filler with what may be termed a "penetrating" resin. Many of the principal resins which are used to saturate fillers for the formation of laminates are considered to be "coating" resins rather than penetrating resins, the distinction being due primarily to the larger molecular size of the former. Accordingly, in most instances, the fillers used for laminates of the present invention are, preferably, initially impregnated with a penetrating resin prior to coating with the unsaturated oil-acid and epoxy resin system. A phenolic resole consisting predominantly of a low molecular weight phenol-formaldehyde condensation product is normally employed, such as Bakelite 3913. This first coat is dried and slightly cured before application of the principal resin system.

After impregnation, the web is normally cut into individual sheets of a desired length and a plurality of the impregnated sheets superimposed to form an assembly, the number of sheets used in making up the assembly being determined by the ultimate thickness required in the laminate. The assembly of impregnated sheets is then inserted between the platens of a press and subjected to heat and pressure for a sufficient period to finally cure the resin and form a consolidated integral unit which is board-like in character. While in the press, the impregnated filler assembly is subjected to temperatures of between about 280°–350° F. and pressures of from about 1000–2000 pounds per square inch for a period of approximately fifty to one hundred and twenty minutes. It will be appreciated that the conditions for the press cure will depend on a number of factors, such as the type of resin and filler used as well as the number of sheets in the assembly.

The following examples further illustrate the invention without intending to thereby limit the same.

Example I

One mole of domestic tung oil, taken as the trieleostearate, together with one mole of maleic anhydride were charged into a three liter glass reaction kettle, equipped with a variable speed stirrer, thermometer, Dean-Stark trap, water-jacketed reflux condenser and a thermocouple of a continuous temperature recorder. The glass reaction kettle was heated by means of a full heating mantle, where the rate of heat input was controlled by a variac. The temperature of the reactants was gradually increased to 280° F.±10° F. At about 140 F., the reactants became exothermic. Exotherm was controlled by reducing the rate of heat input. When the reactants reached 280° at the end of one hour heat-up time, the refractive index was 1.5110 at 21.6° C. The reactants were then held at 280° F. for an additional hour, after which the batch was cooled to room temperature. No solvent was added. The refractive index of the finished batch was 1.5100 at 21.6° C., the specific gravity 0.997 and the viscosity 1640 cps. as measured by a Brookfield viscometer, #2 spindle at 20 r.p.m., measurements being made at 77° F. The adduct had an iodine number of 125.

Fifty parts of the above tung-maleic adduct were then mixed in a solvent with 50 parts of Shell Epon 1001, which is a solid reaction product of epichlorohydrin and bisphenol-A, having an epoxy and also an hydroxy equivalent of 3.75–4.56 (grams per reactive group). The solvent was a mixture consisting of 50 parts of methyl ethyl ketone and 50 parts of isopropyl alcohol.

A ten mil thick cotton linter paper was initially impregnated with Bakelite 3913 resole and dried, the resin content after this impregnation being fifteen percent based on the total weight of resin and paper. Following the resole impregnation, the paper was then saturated with the foregoing adduct-epoxy varnish and dried at a temperature of about 320° F. The total resin content was determined to be fifty-five percent based on the combined weight of resin and paper. Sufficient impregnated sheets were then superimposed to form a laminate after press treatment of one-sixteenth of an inch thick. The assembly was then subjected to a pressure of 1200 p.s.i. at a temperature of 310° F. for a period of seventy minutes. This laminate was found to have an insulation resistance of 240,000 megohms, a power factor under "A" conditions of .0374 and could be punched at a temperature of below 100° F. without cracking or chipping in the vicinity of the punched area.

Example II

One mole of domestic tung oil together with two moles of maleic anhydride were charged into the same reaction equipment heated in the same manner as described in Example I. The resulting adduct had a refractive index of 1.5038 at 21.8° C., a specific gravity of 1.048 and a viscosity of 11,600 c.p.s. The adduct had an iodine number of 96.

Fifty parts of the tung-maleic adduct were mixed with 50 parts of Epon 1001 in the same solvent mixture of Example I and a laminate made, including the resole first coat, as described above.

The resulting laminate was easily fabricated at about 75° F. and had the following properties:

Flexural strength (L) _____ p.s.i__ 23,500
Flexural strength (C) _____ p.s.i__ 20,200
Power factor "A" _____ .028
Insulation resistance _____ megohms __ 700,000
Dielectric constant "A" _____ 4.0

Example III

An adduct was formed from one mole of domestic tung oil and three moles of maleic anhydride using the process of Example I. The resulting adduct had a refractive index of 1.5000 at 21.8° C., specific gravity of 1.078, a viscosity of 14,000 c.p.s. and an iodine number of 77.

Fifty parts of this tung-trimaleate were mixed with 50 parts of Epon 1001 in the solvent of Example I, and processed into a laminate also using the process and conditions of Example I. Insulation resistance of the laminate was 480,000 megohms and it had a power factor under "A" conditions of .0339 and a moisture absorption of 0.515. The laminate was readily fabricated at a temperature of 75° F.

Example IV

Forty parts of the tung-maleic adduct of Example I were mixed with 40 parts of Epon 1001 and 20 parts of a cresylic resole (Plyophen 5030) and used to make a laminate in the same manner as employed in Example I. The power factor was .029; insulation resistance 300,000 megohms; dielectric constant "A" 0.339 and moisture absorption 0.647. The laminate was readily punched at 77° F. in patterns with very small holes and at 40° F. in less critical patterns.

Example V

Forty parts of the tung-meleic adduct of Example III were mixed with 40 parts of Epon 1001 and 20 parts of a cresylic resole (Plyophen 5030) in the same solvent and processed into a laminate as described in Example I. The laminate was tested and found to have a moisture absorption of 0.590; power factor "A" 0.028; dielectric constant "A" 3.91 and an insulation resistance of 1,500,000 megohms. It was satisfactorily punched below 100° F.

*Example VI*

Twenty parts of the tung-maleic adduct of Example I were mixed with 60 parts of Epon 1001 and 20 parts of a melamine-formaldehyde resin in a suitable solvent mixture, similar to the one given under Example I, and processed into a laminate. Properties of the resulting laminate were as follows: moisture absorption 0.688; power factor "A" 0.0277; dielectric constant "A" 3.89 and an insulation resistance of 86,300.

As further illustrating the potential of the present resin system, the following examples are presented of films made on glass plate slanted at a 45° angle. Each film was allowed to stand for ten minutes at room temperature to permit the bulk of the solvent to evaporate and was then subjected to an air-circulating oven for fifteen minutes at 330°±10° F. The films were then subjected to a post-bake at 400° F. for ten minutes outside the oven.

*Example VII*

Fifty parts of the tung-maleic adduct of Example I were mixed with 50 parts of an epoxylated novolak having a functionality greater than 3 in methyl ethyl ketone as a solvent together with one percent, based on resin solids, of DMP30 (Rohm and Haas—tertiary amine). The resulting film had a pencil hardness of HB and was a tough, tack-free film, which was not attacked by either acetone, methyl alcohol or xylene.

*Example VIII*

A film similar to that of Example VII was prepared using polyallylglycidylether instead of the novolak. The resulting film exhibited the same properties as the film of Example VII.

In general, NEMA or ASTM test procedures are used in evaluating properties, typical properties and the appropriate procedures being as follows:

| | |
|---|---|
| Flexural strength | ASTM D-790 |
| Water absorption | ASTM D-229 |
| Power factor | ASTM D-150 |
| Dielectric constant | ASTM D-150 |

Frequently, the ability of a laminate to be fabricated is measured by ASTM test D-617 using a temperature of 77° F., wherein ratings vary from 0-100. Laminates made in accordance with the present invention will, in general, have a rating of between about 80-100.

A variety of laminates may be made in accordance with the principles of the present invention, which have not only properties enabling them to be readily fabricated at or near ambient room temperatures but, also, electrical and physical properties that are equivalent to or better than properties of many currently available commercial laminates and, particularly, laminates of the NEMA XXXP grade. Typical XXXP grade laminate properties are: a minimum insulation resistance of 20,000 megohms, a power factor under "A" conditions of .0350 and flexural strengths of at least 2000 and 10,500 lengthwise and crosswise, respectively. Additional properties and test procedures are to be found in NEMA publication LP-1-1959 (May).

For use in making so-called "printed circuits," which have gained rather wide acceptance in the electronic industry, laminates of the present invention may be provided with a surface lamina of copper on one or both sides.

Of special interest is the fact that laminates made in accordance with the invention have been found to have an unusual characteristic which may be referred to as "memory" wherein a laminate may be deformed to an appreciable degree, but will subsequently return to its original shape following removal of the deformation force.

Having described the invention and certain exemplary embodiments thereof, the same is only intended to be limited by the scope of the following claims.

I claim:

1. A synthetic, board-like laminate capable of being fabricated at a temperature of between 40°-100° F. without appreciable creation of cracks or chips which comprises a plurality of superimposed filler sheets each of which has been impregnated with a heat-curable resinous composition comprising: (1) the reaction product of an unsaturated oil and an unsaturated polycarboxylic acid, and (2) an epoxylated compound containing a plurality of epoxy groups, the whole assembly having been consolidated as an integral unit by heat and pressure.

2. A laminate as described in claim 1 wherein the filler sheets are composed of cellulosic fibers.

3. A laminate as described in claim 1 wherein said unsaturated oil is tung oil.

4. A laminate as described in claim 1 wherein said unsaturated polycarboxylic acid is maleic acid.

5. A laminate as described in claim 1 wherein said epoxylated compound is the diglycidyl ether of a bisphenol.

6. A laminate as described in claim 1 wherein said epoxylated compound is the polyglycidyl ether of a permanently fusible phenolic-aldehyde condensation product.

7. A synthetic, board-like laminate capable of being fabricated at a temperature of between 40°-100° F. without appreciable creation of cracks or chips which comprises a plurality of superimposed cellulosic fiber filler sheets each of which is impregnated with a heat-curable resinous composition comprising: (1) the reaction product of tung oil and maleic acid, and (2) a diglycidyl ether of a bisphenol, the whole assembly having been consolidated as an integral unit by heat and pressure.

8. A laminate as described in claim 7 wherein at least one surface has a layer of conductive metal united thereto.

9. A process of making a synthetic, board-like laminate including the steps of impregnating a filler sheet with a resinous composition comprising: (1) the reaction product of an unsaturated oil and an unsaturated polycarboxylic acid, and (2) an epoxylated compound containing a plurality of epoxy groups, superimposing a plurality of said impregnated filler sheets to form an assembly, and consolidating said assembly by heat and pressure to form an integral unit.

10. A process as described in claim 9 wherein the impregnated filler sheet is subjected to an initial drying operation at elevated temperatures prior to forming said assembly to remove volatiles and partially advance the cure of said resinous composition.

11. A process as described in claim 10 wherein the filler is composed predominantly of cellulosic fibers.

12. A process as described in claim 10 wherein said unsaturated oil is tung oil.

13. A process as described in claim 10 wherein said unsaturated polycarboxylic acid is maleic acid.

14. A process as described in claim 10 wherein said epoxylated compound is the diglycidyl ether of a bisphenol.

15. A process as described in claim 10 wherein the resinous composition includes a catalyzing agent containing at least one group from the class consisting of amine and hydroxyl groups.

16. A process of making a synthetic, board-like laminate including the steps of impregnating a cellulosic fiber filler sheet with a heat-curable resinous composition comprising: (1) the addition reaction product of tung oil and maleic acid, and (2) the diglycidyl ether of a bisphenol, subjecting said impregnated filler sheet to a drying operation to remove volatiles and partially advance the cure of said resinous composition, superimposing a plurality of said impregnated filler sheets to form an assembly, and consolidating said assembly by heat and pressure to form an integral unit.

17. A process as described in claim 16 wherein said filler is initially impregnated with a phenolic resole comprising predominantly the condensation product of phenol and formaldehyde.

References Cited in the file of this patent

UNITED STATES PATENTS

| | | |
|---|---|---|
| 2,198,805 | Dellehay | Apr. 30, 1940 |
| 2,415,763 | Ryan | Feb. 11, 1947 |
| 2,848,433 | Eirich | Aug. 19, 1958 |

FOREIGN PATENTS

| | | |
|---|---|---|
| 777,621 | Great Britain | June 26, 1957 |